United States Patent
Lai et al.

(12) 
(10) Patent No.: US 6,209,577 B1
(45) Date of Patent: Apr. 3, 2001

(54) MODULATING ACTION NON-FLOWING PILOT OPERATED RELIEF VALVE

(75) Inventors: Ying-San Lai; Erwin R. S. Cortez, both of North Royalton, OH (US)

(73) Assignee: Curtiss-Wright Flow Control Corporation, Lyndhurst, NJ (US)

( * ) Notice: Subject to any disclaimer, the term of this patent is extended or adjusted under 35 U.S.C. 154(b) by 0 days.

(21) Appl. No.: 09/271,836

(22) Filed: Mar. 18, 1999

Related U.S. Application Data

(63) Continuation-in-part of application No. 09/076,493, filed on May 12, 1998, now Pat. No. 5,950,657.

(51) Int. Cl.$^7$ .................................................. F16K 31/124
(52) U.S. Cl. ..................... 137/489.5; 137/489; 137/492
(58) Field of Search ............................... 137/489, 489.5, 137/492

(56) References Cited

U.S. PATENT DOCUMENTS

| | | |
|---|---|---|
| 3,403,699 | 10/1968 | Fites . |
| 3,512,560 | 5/1970 | Weise . |
| 3,848,630 | 11/1974 | Weise . |
| 4,425,938 | 1/1984 | Papa et al. . |
| 4,442,860 | 4/1984 | Taylor . |
| 4,445,531 | 5/1984 | Powell . |
| 4,559,970 | 12/1985 | Taylor et al. . |
| 4,586,533 | 5/1986 | Estes . |
| 4,664,151 | 5/1987 | Piet . |
| 4,768,539 | 9/1988 | Pringle . |
| 4,848,397 | 7/1989 | Bickford et al. . |
| 5,027,852 | 7/1991 | McNeely . |
| 5,213,133 | 5/1993 | Ellett . |
| 5,590,684 | 1/1997 | Alberts et al. . |
| 5,725,015 | 3/1998 | Theodos et al. . |
| 5,738,333 | 4/1998 | Cognevich et al. . |

*Primary Examiner*—Michael Buiz
*Assistant Examiner*—Ramesh Krishnamurthy
(74) *Attorney, Agent, or Firm*—Pearne & Gordon LLP

(57) ABSTRACT

A pilot valve includes a body having a channel formed therein, an inlet chamber formed along the channel, an inlet port in communication with the inlet chamber, a control port in communication with the channel, and a vent port in communication with the channel. A piston is movable within the channel in response to fluid pressure within the inlet chamber. A first spool is movable within the channel and is rigidly secured to the piston to move therewith. A second spool is movable within the channel and carries a vent-valve disc. The second spool also carries an inlet-valve seat which cooperates with an inlet-valve disc carried by the first spool to regulate fluid flow between the inlet chamber and the control port. A vent-valve seat is rigidly secured to the body and cooperates with the vent-disc carried by the second spool to regulate flow between the control port and the vent port. A first spring urges the first spool in a direction opposite pressure in the inlet chamber. A second spring is located between the piston and the second spool such that the piston resiliently bears on the second spool via the second spring to close the vent-valve when the inlet valve is open.

23 Claims, 6 Drawing Sheets

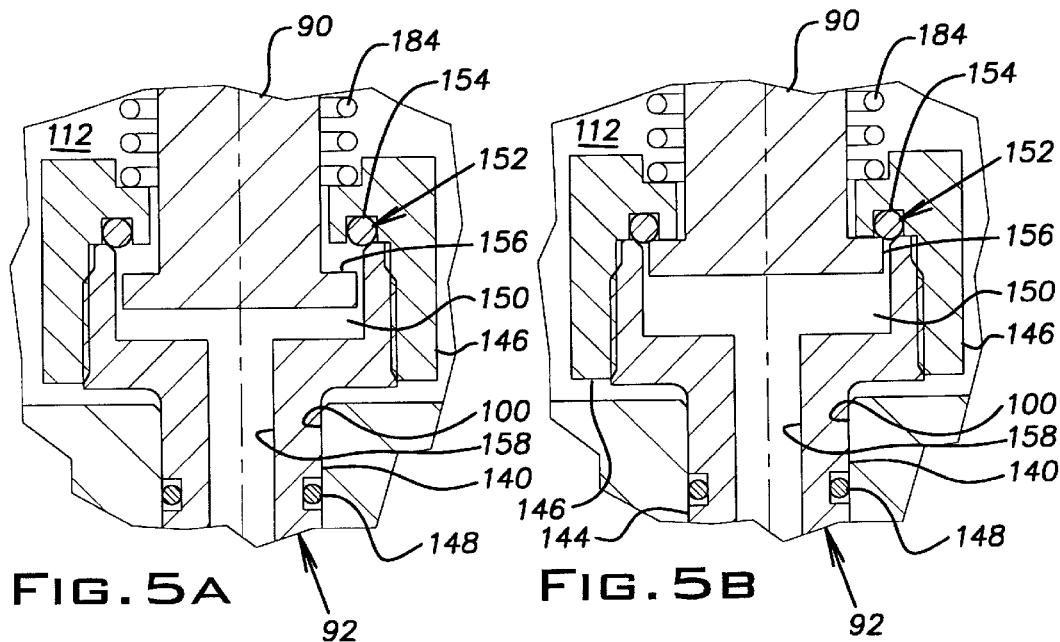
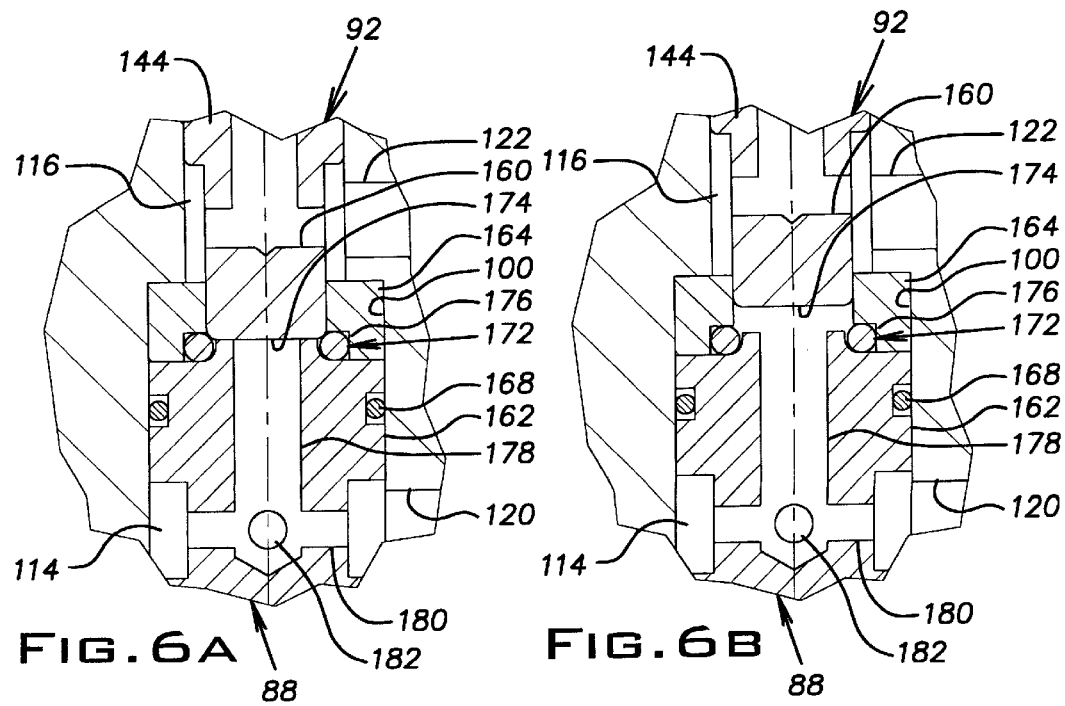

MODULATING ACTION NON-FLOWING PILOT OPERATED RELIEF VALVE

This application is a continuation-in-part of U.S. application Ser. No. 09/076,493 filed on May 12, 1998. Now U.S. Pat. No. 5,950,657.

BACKGROUND OF THE INVENTION

The present invention generally relates to fluid pressure relief valves of the type operated by a pilot valve and, more particularly, to pilot operated relief valves of the non-flowing type.

A safety pressure-relief system typically includes a relief or main valve mounted over a pressure vessel, such as a tank or flow line, and a pilot valve which controls operation of the main valve. The main valve moves to an open position when the fluid pressure within the vessel rises above a predetermined set value to relieve or reduce the fluid pressure within the vessel and moves back to a closed position when the fluid pressure within the vessel is reduced below the set value.

Preferably, the pilot valve is of a non-flowing type wherein no system fluid flows through the pilot valve when the main valve is in a static condition below the set value or open and flowing. Non-flowing pilot valves typically have a higher sensitivity and a faster response to pressure changes in the system fluid as compared with pilot valves having a continuous fluid flow therethrough. Additionally, these pilot valves may have superior operation when the relief valve is returned to its closed position because the pilot valve is not influenced by flowing system fluid.

Typically, the fast response of these pilot valves is obtained by a snap or pop action of valve elements. For example, see U.S. Pat. No. 3,664,362, disclosing a non-flowing type pilot valve, the disclosure of which is expressly incorporated herein by reference in its entirety. Fluid flows through the pilot valve and changes a dome pressure of the main valve to activate a fluid pressure responsive element, such as a piston or diaphragm. The valve elements are quickly snapped to a full open condition.

This fast response, however, may at times need to be limited. For example, pressure spikes or extremely short duration rises in pressure may cause system fluid to be discarded due to the fast reaction of the pop-action valve elements. Thus, the fast reaction may be too fast and result in an excessive loss of system fluid, that is, a greater volume of system fluid than is required to reduce the system pressure back to the set value. This excessive loss of system fluid is particularly a concern when a relatively expensive system fluid is discarded.

There have been prior attempts to solve this problem by forming non-flowing pilot valves with modulating action, that is, the relief valve is partially opened an amount in proportion to the magnitude of the overpressure. For example, see U.S. Pat. No. 4,586,533 disclosing a non-flowing type pilot valve, the disclosure of which is expressly incorporated herein by reference in its entirety. While these pilot valves have provided some modulating action, the amount the relief valve opens is still not proportional to the magnitude of the overpressure in a substantially linear manner. Additionally, a sleeve assembly may be subjected to undesirable loads when utilized in relatively high pressure applications.

U.S. patent application Ser. No. 09/076,493, the disclosure of which is expressly incorporated herein by reference in its entirety, discloses a non-flowing pilot operated relief valve which provides substantially improved modulating action. A spool of the embodiments disclosed therein, however, may be subjected to undesirable levels stress when utilized in relatively high pressure applications. Accordingly, there is a need in the art for a non-flowing pilot operated relief valve which provides improved modulating action and does not subject components to undesirable loads in high pressure applications.

SUMMARY OF THE INVENTION

The present invention provides a non-flowing pilot valve which overcomes at least some of the above-described problems of the related art. The pilot valve includes a body having a channel formed therein, an inlet chamber formed along the channel, an inlet port in communication with the inlet chamber, a control port in communication with the channel, and a vent port in communication with the channel. A first spool is movable within the channel in response to fluid pressure within the inlet chamber. A second spool is movable within the channel. The second spool cooperates with the first spool to form an inlet valve which regulates fluid flow between the inlet chamber and the control port. The second spool also cooperates with the body to form a vent valve regulating flow between the control port and the vent port. A spring is located between the first spool and the second spool such that it urges the first and second spools in opposite directions. Preferably, the first spool resiliently bears on the second spool via the spring to close the vent-valve when the inlet valve is open. With the vent valve closed in this resilient manner, the components are not subjected to undesirable levels stress when the pilot valve is utilized in relatively high pressure applications.

BRIEF DESCRIPTION OF THE SEVERAL VIEWS OF THE DRAWING

These and further features of the present invention will be apparent with reference to the following description and drawings, wherein:

FIG. 5A is an enlarged fragmentary view of a portion of the pilot valve of FIGS. 4A and 4B showing an inlet valve in an open condition;

FIG. 5B is an enlarged fragmentary view of a portion of the pilot valve of FIGS. 4A and 4B showing the inlet valve in a closed condition;

FIG. 6A is an enlarged fragmentary view of a portion of the pilot valve of FIGS. 4A and 4B showing a vent valve in a closed condition; and FIG. 6B is an enlarged fragmentary view of a portion of the pilot valve of FIGS. 4A and 4B showing the vent valve in an open condition;

DETAILED DESCRIPTION OF PREFERRED EMBODIMENTS

Figure 1:
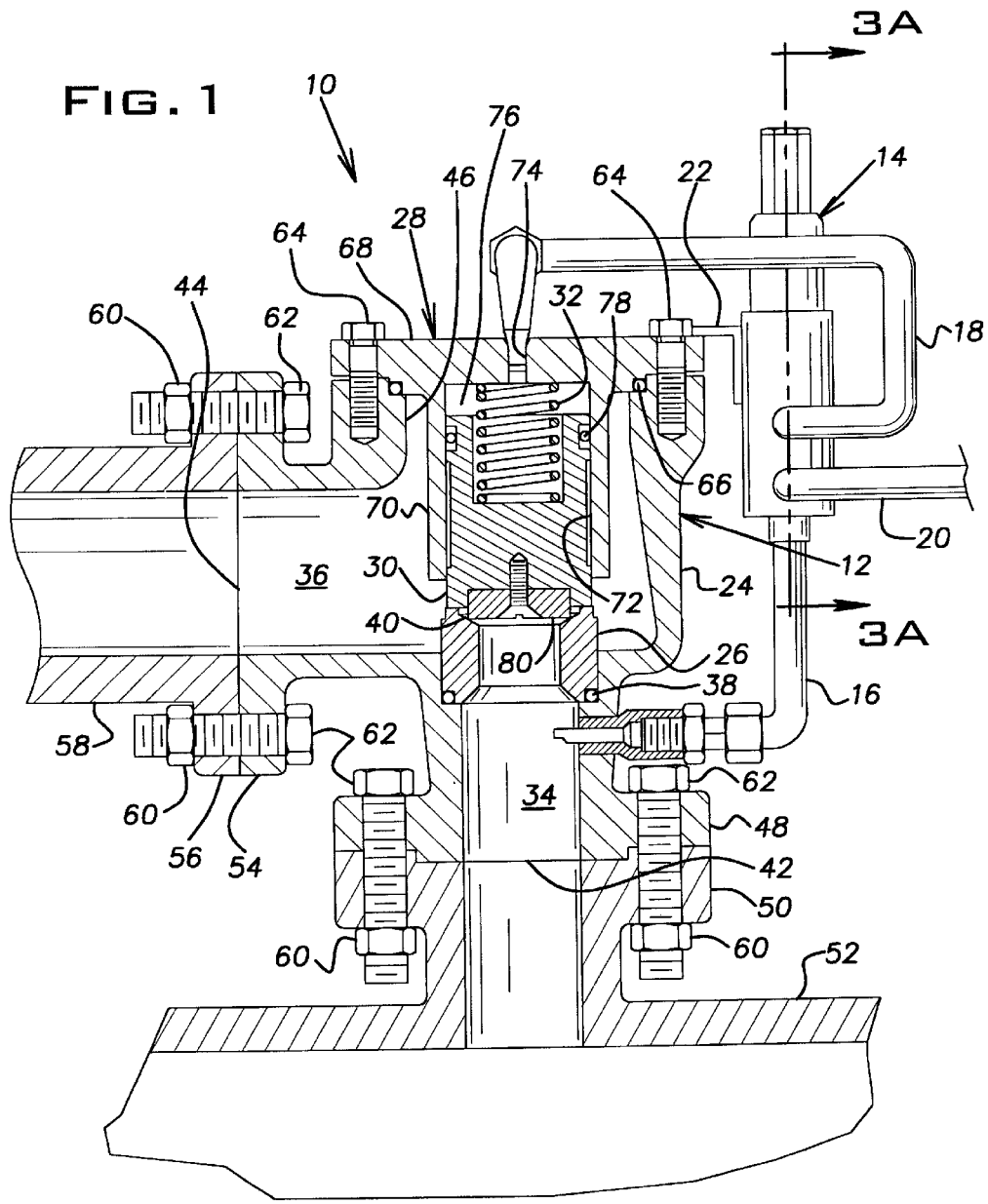
FIG. 1 is an elevational view, in partial cross-section, of pressure relief valve system having a relief valve and a pilot valve according to the present invention, wherein the relief valve is shown in a closed position.

FIG. 1 illustrates a pilot-operated pressure-relief valve system 10 according to the present invention. The pressure-relief valve system 10 includes a relief or main valve 12, a pilot valve 14, an inlet line or tube 16 extending between the main valve 12 and the pilot valve 14, a control line or tube 18 extending between the main valve 12 and the pilot valve 14, and a discharge line or tube 20 extending from the pilot valve 14. Additionally, a support 22 is preferably provided which secures the pilot valve 14 to the main valve 12.

The main valve 12 is preferably of conventional construction including a body 24 forming a hollow interior cavity, a nozzle element 26, a cap or cover 28, a piston 30, and a compression spring 32. The nozzle element 26 is secured to the body 24 within the interior cavity and divides the interior cavity into a first or inlet chamber 34 and a second or outlet chamber 36. The nozzle element 26 is secured to the body 24 in any suitable manner such as, for example, the illustrated press fit. A suitable seal member 38 such as, for example, the illustrated o-ring is provided between the nozzle element 26 and the body 24 to form a fluid-tight seal therebetween. One end of the nozzle element 26, which faces the outlet chamber 36, forms an annularly-shaped valve seat 40.

The body 24 has a first or lower opening 42 in communication with the inlet chamber 34, a second or side opening 44 in communication with the outlet chamber 36, and a third or upper opening 46 in communication with the outlet chamber 36. The first opening 42 has a first flange 48 which is sealingly connected to an outlet flange 50 of a pressure vessel or tank 52 holding a pressurized fluid. The second opening 44 has a second flange 54 which is sealingly connected to an inlet flange 56 of a discharge line or pipe 58. The flanges 48, 50, 54, 56 are sealingly connected in any suitable manner such as, for example, the illustrated nut 60 and bolt 62 combinations.

The third opening 46 is closed by the cover 28. The cover 28 is secured to the body 24 by any suitable manner such as, for example, the illustrated threaded fasteners 64. A suitable seal member 66 such as, for example, the illustrated o-ring is preferably provided between the body 24 and the cover 28 to form a fluid-tight seal therebetween.

The cover 28 includes a generally planar wall portion 68 which closes the third opening 46 and an tubularly-shaped sleeve portion 70 which perpendicularly extends from the wall portion 68 into the outlet chamber 36 and defines a cylindrically-shaped bore 72. One end of the bore 72 is open and faces the valve seat 40 of the nozzle element 26 and the other end is closed except for a port 74 extending through the wall portion 68.

The piston 30 is mounted for reciprocal movement within the bore 72 and has a hollow end facing the wall portion 68. The piston 30 cooperates with the cover 28 to form a dome chamber 76 therebetween. A suitable seal member 78 is mounted in an annular groove about the piston 30 and rides in sealing relationship with the wall of the bore 72 as the piston 30 moves within the bore 72. Mounted on an end of the piston 30 facing the valve seat 40 is a valve-seat seal 80 arranged to seal the nozzle element 26 when engaging the valve seat 40. The valve-seat seal 80 is attached to the piston 30 in any suitable manner such as, for example, the illustrated retainer and threaded fastener.

The compression spring 32 is located within the dome chamber 76 between the hollow end of the piston 30 and the wall portion 68 of the cover 28. The compression spring 32 biases the piston 30 toward the nozzle element 26 with the valve-seat seal 80 in sealing contact with the valve seat 40 to prevent fluid flow between the inlet and outlet chambers 34, 36.

Figures 3A, 3B:
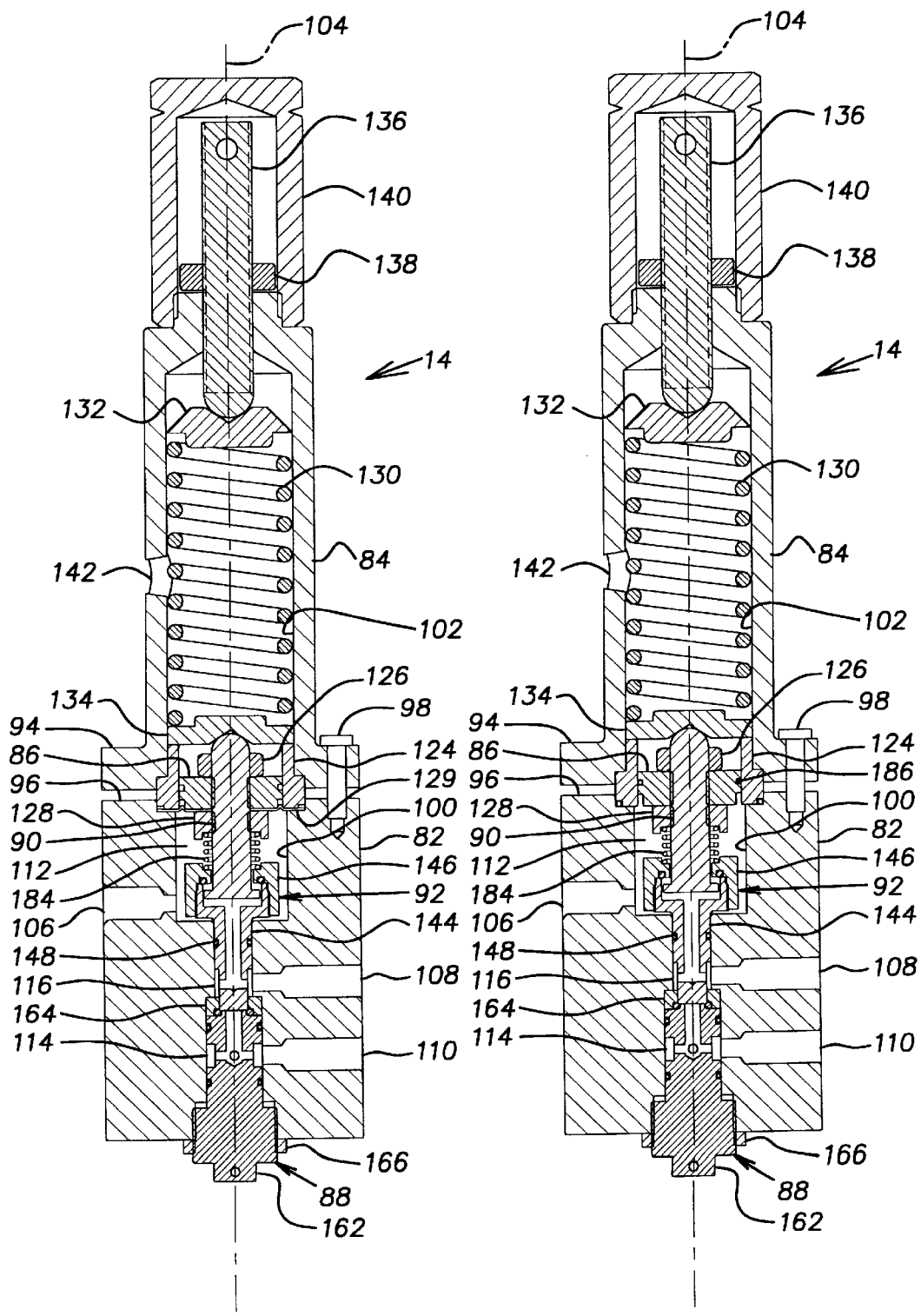
FIG. 3A is an enlarged sectional view, taken along line 3—3 of FIG. 1, showing a first embodiment of the pilot valve, wherein lines connecting relief valve and the pilot valve are removed for clarity.
FIG. 3B is an enlarged sectional view, taken along line 3—3 of FIG. 1, showing a second embodiment of the pilot valve, wherein connecting lines are removed for clarity.
Figure 4A:
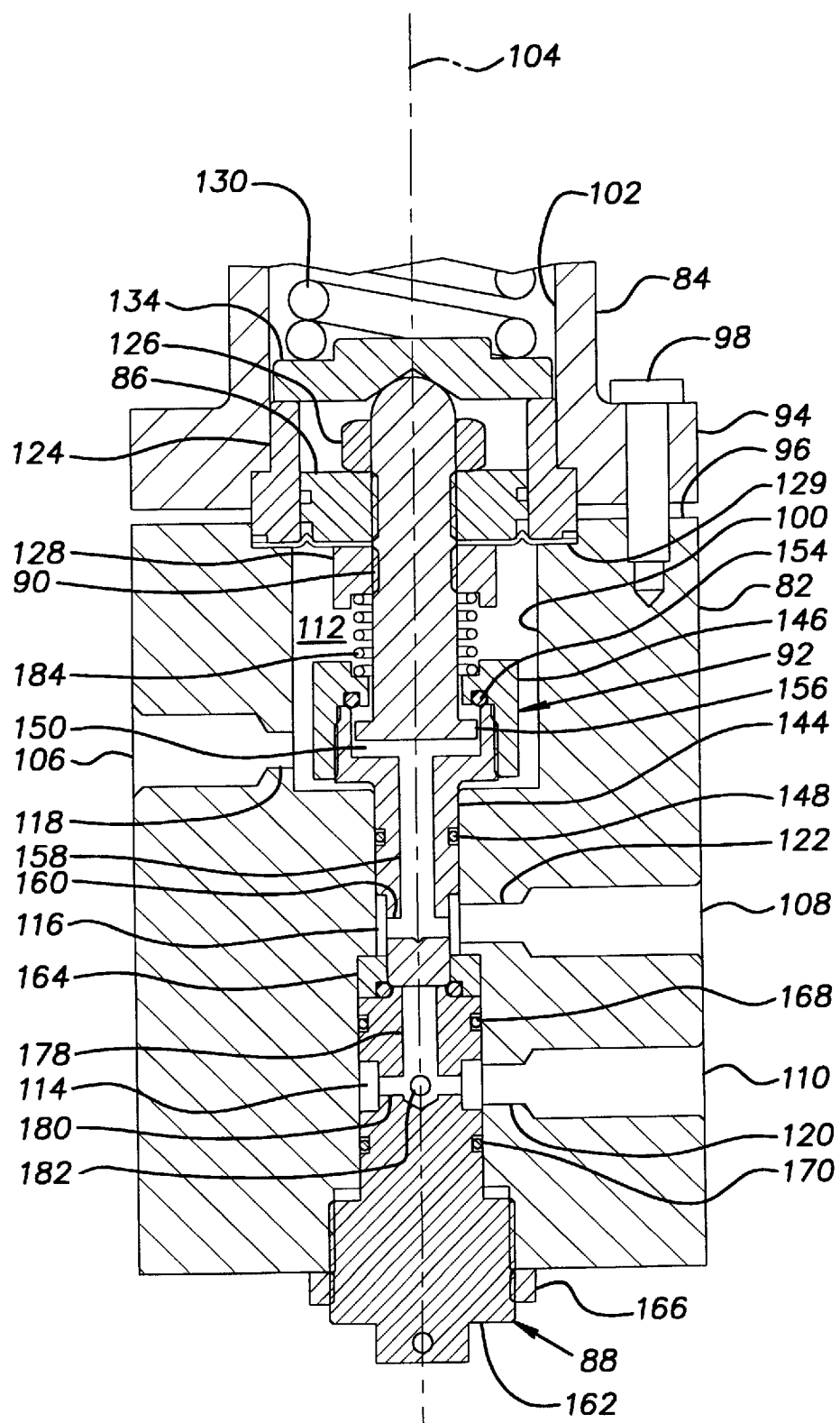
FIG. 4A is an enlarged fragmentary view of a portion of the pilot valve of FIG. 3A.

As best shown in FIGS. 3A and 4A, the pilot valve 14 has a valve body including a main body 82 and a bonnet 84 attached to the main body 82. The pilot valve 14 also includes a movable upper piston 86 located generally near the interface of the main body 82 and the bonnet 84, a vent assembly 88 adjustably secured to the main body 82, a first or upper spool 90, extending within the main body 82 and movable with the upper piston 86, and a second or lower spool 92 operably associated with the upper spool 90 and engageable with the vent assembly 88.

The bonnet 84 has a flange 94 adapted to cooperate with a top surface 96 of the main body 82. A plurality of threaded fasteners 98 downwardly extend through openings in the bonnet flange 94 and into threaded blind holes located in the main body 82 to secure the main body 82 and the bonnet 84 together. The main body 82 and the bonnet 84 are provided with vertically extending channels or bores 100, 102 having a common central axis 104. The bores 100, 102 preferably have a circular cross-section and cooperate with one another as described in more detail hereinafter.

The main body 82 has an upper or inlet port 106, an intermediate or control port 108, and a lower or vent port 110 which are each substantially perpendicular to the central axis 104 and in fluid flow communication with the main body bore 100. The bore 100 of the main body 82 includes an inlet chamber 112 at least partially formed by an upper portion of the bore 100 located at or near the top of the main body, a discharge or vent chamber 114 at least partially formed by a lower portion of bore 100 located near the bottom of the main body 82, and a control chamber 116 at least partially formed by an intermediate portion of the bore 100 and located between and spaced-apart from the inlet and vent chambers 112, 114. The upper portion of the bore 100 preferably has a diameter larger than both the intermediate and lower portions, while the lower portion of the bore 100 preferably has a diameter larger than the intermediate portion and smaller than the upper portion. A first radially extending passage 118 connects the inlet port 106 with the inlet chamber 112, preferably near lower end of the inlet chamber 112. A second radially extending passage 120 connects the vent port 110 with the vent chamber 114. A third radially extending passage 122 connects the control port 108 with the control chamber 116.

The movable upper piston 86 is slidably received in a bore of a sleeve 124 which is coaxial with the bores 100, 102 of the main body 82 and the bonnet 84. The sleeve 124 connects the bores 100, 102 of the main body 82 and the bonnet 84 and forms an upward-facing annular-shaped stop or abutment. In the illustrated embodiment, the sleeve is located within counterbores at the upper end of the main body bore 100 and the lower end of the bonnet bore 102 and is clamped between the main body 82 and the bonnet 84. The sleeve 124 is rigidly secured to the main body so that the stop or abutment is also rigidly secured thereto. The upper piston 86 is rigidly secured to the upper spool 90 for longitudinal movement therewith near an upper end of the upper spool 90. In the illustrated embodiment, the upper spool 90 threadably extends through the upper piston 86 and is secured between a nut 126 located above the upper piston 86 and a retainer 128 located below the upper piston 86. The nut 126 and the retainer 128 are each preferably threadably engaged with the upper spool 90.

A diaphragm 129 of suitable flexible material is secured between the upper piston 86 and the main body 82. The inner edge of the diaphragm 129 is clamped between the lower end of the upper piston 86 and the upper end of the retainer 128. The outer edge of the diaphragm 129 is clamped between an upward facing surface of the main body 82 and the lower end of the sleeve 124. Arranged in this manner, the system pressure, which is continually present in the inlet chamber 112, is applied to the effective area of the upper piston 86 and the diaphragm 129 to move the upper piston 86, and the upper spool 90 secured thereto, in an upward direction.

A first or upper compression spring 130 is located within the bore 102 of the bonnet 84 between opposed upper and lower spring followers 132, 134. The lower spring follower 134 directly engages the top of the upper spool 90 so that the upper compression spring 130 applies a downward bias or force on the upper spool 90 and the upper piston 86 secured thereto. The abutment formed by the sleeve 124 limits the downward axial movement of the lower spring follower 134 and the upper compression spring 130. A threaded adjustment screw 136 extends through a threaded opening at the top of the bonnet 84 and engages the upper spring follower 132. Longitudinal movement of the adjustment screw 136 adjusts the loading of the upper compression spring 130. A lock nut 138 is provided which secures or locks the adjustment screw 136 in its longitudinal position once a desired force is applied by the upper compression spring 130 to the upper spool 90. A removable cap 140 covers the otherwise exposed top portion of the adjustment screw 136 to provide protection thereto. The cap 140 has internal threads which cooperate with external threads at an upper end of the bonnet 84 to secure the cap 140 to the bonnet 84. A suitable vent hole 142 is provided in the bonnet 84 for movement of the upper piston 86.

The lower spool 92 includes a body 144 and a retainer 146. The lower spool body 144 has an upper portion, an intermediate portion of smaller diameter than the upper portion, and a lower portion of smaller diameter than the intermediate portion. The intermediate portion of the lower spool body 144 is sized to be closely received in the central portion of the main body bore 100 for axial movement therein along the central axis 104. A seal member 148, such as the illustrated o-ring, is carried by the intermediate portion of the lower spool body 144 to provide a fluid-tight seal between the lower spool body 144 and the main body 82. The lower portion of the lower spool body 144 is sized to cooperate with the intermediate portion of the bore 100 to form the control chamber 116 therebetween. Formed in this manner, the control chamber 116 is generally tubular shaped.

The upper portion of the lower spool body 144 is provided with a counterbore forming an upward facing valve chamber 150 receiving the lower end of the upper spool 90 therein. The retainer 146 is threadably secured to the upper portion of the lower spool body 144 and partially closes the open upper end of the valve chamber 150. The retainer 146 has a central opening for passage of a lower portion of the upper spool 90 therethrough.

The upper spool 90 and the lower spool 92 cooperate to form an inlet valve 152 which regulates fluid flow between the inlet chamber 112 and the control chamber 116 (best shown in FIGS. 4A, 5A, and 5B). The lower spool body and retainer 144, 146 cooperate to form an inlet-valve seat 154 at the upper end of the lower spool 92 and within the valve chamber 150. The upper spool 90 has an enlarged lower end forming an inlet-valve disc or closure 156 which cooperates with the inlet-valve seat 154 of the lower spool 92. The inlet-valve disc 156 or the inlet-valve seat 154 is preferably provided with a seal member, such as the illustrated o-ring, to provide a fluid-tight seal when the inlet-valve disc 156 closes the inlet-valve seat 154. In the illustrated embodiment, an o-ring is held between the retainer 146 and the lower spool body 144 as part of the inlet-valve seat 154. It is noted that the inlet valve 152 can alternatively have a seat formed by the upper spool 90 and a closure formed by the lower spool 92.

The lower end of the upper spool 90 is sized larger than the opening in the lower spool retainer 146 so that the upper and lower spools 90, 92 are interlocked to allow but limit relative movement therebetween. The inlet-valve disc 156 and inlet-valve seat 154 are arranged such that the inlet-valve disc 156 closes the inlet-valve seat 154 when the upper spool 90 is at its upper most limit relative to the lower spool 92. Arranged in this manner, upward movement of the upper spool 90, relative to the lower spool 92, moves the inlet-valve disc 156 toward the inlet-valve seat 154. When the inlet-valve disc 156 is seated on the inlet-valve seat 154, upward movement of the upper spool 90 upwardly moves the lower spool 92 therewith.

A first control passage 158 axially extends along the central axis 104 from the valve chamber 150 to a central point along the lower portion of the lower spool body 144. A second control passage 160 radially extends through the lower portion of the lower spool body 144 from an outer surface to the first control passage 158. The first and second control passages 158, 160 are sized and shaped to connect the valve chamber 150 with the control chamber 116. When the inlet valve 152 is unseated, there is fluid-flow communication between the inlet chamber 112 and the control chamber 116 (as shown in FIGS. 4A and 5A). When the inlet valve 152 is seated, there is no fluid-flow communication between the inlet chamber 112 and the control chamber 116 (as shown in FIGS. 5B).

The vent assembly 88 includes a body 162, a retainer 164, and a jam nut 166. An upper end of the vent-assembly body 162 is sized and shaped to be closely received in the lower portion of the main body bore 100. A reduced diameter region is provided along the upper end of the body which cooperates with the lower portion of the main body bore 100 to form the vent chamber 114. Formed in this manner, the vent chamber 114 is generally tubular shaped. A pair of spaced-apart seal members 168, 170, such as the illustrated o-rings, are carried by the upper end of the vent-assembly body 162 on opposite ends of the reduced diameter portion to provide a fluid-tight seal between the vent-assembly body 162 and the main body 82.

The vent-assembly retainer 164 is also sized to be received in the lower portion of the main body bore 100 and is located between the upper end of the vent-assembly body 162 and the downward facing abutment formed at the interface between the intermediate and lower portions of the bore 100. The vent-assembly retainer 164 has an opening axially extending along the central axis 104 which is sized for passage of the lower end of the upper spool 90 therethrough.

The lower spool 92 and the vent assembly 88 cooperate to form a vent valve 172 which regulates the flow of fluid between the control chamber 116 and the vent chamber 114. The lower end of the lower spool 92 forms a vent-valve disc or closure 174. The vent-assembly retainer 164 cooperates with the upper end of the vent-assembly body 162 to form a vent-valve seat 176. The vent-valve disc 174 or the vent-valve seat 176 is preferably provided with a seal member, such as the illustrated o-ring, to provide a fluid-tight seal when the vent-valve disc 174 closes the vent-valve seat 176. In the illustrated embodiment, an o-ring is held between the vent-assembly retainer 164 and the vent-assembly body 162 to form the vent-valve seat 176. It is noted that the vent valve 172 can alternatively have a seat formed by the lower spool 92 and a closure formed by the vent assembly 88.

A first vent passage 178 axially extends along the central axis 104 from the vent-valve seat 176 at the top of the vent-assembly body 162 to point adjacent the reduced diameter portion forming the control chamber 116. Second and third vent passages 180, 182 radially extend through the upper portion of the vent-assembly body 162 generally perpendicular to the central axis 104. The passages 178, 180, 182 are sized and shaped such that the control chamber 116 is in fluid flow communication with the vent chamber 114 when the vent valve 172 is open (as shown in FIG. 6B). When the vent valve 172 is closed, there is no fluid-flow communication between the control chamber 116 and the vent chamber 114 (as shown in FIGS. 4A and 6A).

A lower end of the vent-assembly body 162 has a diameter larger than the upper end and is externally threaded to cooperate with an internally threaded counterbore provided at the lower end of the main body bore 100 for longitudinal movement of the vent assembly 88 within the bore. Longitudinal movement of the vent assembly 88 relative to the main body 82, directly adjusts the position of the vent-valve seat 176 within the main body bore 100 so that it can be precisely adjusted. The jam nut 166 secures or locks the vent-assembly body in its longitudinal position relative to the main body 82 once a desired position of the vent-valve seat 176 is obtained.

The pilot valve 14 further includes a second or lower compression spring 184 urging the lower spool 92 toward the vent assembly 88, that is, biasing the vent-valve disc 174 of the lower spool 92 toward the vent-valve seat 176 of the vent assembly 88. The lower compression 184 preferably acts between the upper piston 86/upper spool 90 and the lower spool 92 to urge or bias them in opposite directions. In the illustrated embodiment, the lower compression spring 184 is a helical compression spring and encircles a portion of the upper spool 90 with a top end directly engaging the retainer 128, which is rigidly secured to the upper spool 90 and the upper piston 86, and with a bottom end directly engaging the upper end of the lower spool retainer 146. Counterbores are preferably provided in the retainers 128, 146 to retain the top and bottom ends of the lower compression spring 184. It is noted that the lower compression spring 184 can alternatively be other suitable means for applying a force such as, for example, other types of mechanical springs or fluid pressure.

It can be seen from the above description that the lower compression spring 184 closes the vent valve 172 when the inlet valve 152 is open and the vent valve 172 can only open when the inlet valve 152 is closed because the upper spool 90 must raise the lower spool 92 against the bias of the lower compression spring 184. Therefore, the pilot valve 14 is of the non-flowing type.

As best shown in FIGS. 1, 3A, and 4A the pilot valve 14 is connected to the inlet line 16, the control line 18 and the discharge line 20. The inlet line 16 extends from the main valve 12 to the pilot valve 14. The inlet line 16 is in fluid communication with the inlet chamber 34 of the main valve 12 via a pressure pick-up extending into the inlet chamber 34 and is in fluid communication with the inlet chamber 112 of the pilot valve 14 via the inlet port 106 and first passage 118.

The control line 18 extends from the main valve 12 to the pilot valve 14. The control line 18 is in fluid communication with the dome chamber 76 of the main valve 12 via the dome port 74 in the main valve cover 28 and is in fluid communication with the control chamber 116 of the pilot valve 14 via the control port 108 and the third passage 122.

The discharge line 20 extends from the pilot valve 14 to a drain or container (not specifically shown) wherein fluid can be disposed or recovered. The discharge line 20 is in fluid communication with the vent chamber 114 of the pilot valve 14 via the vent port 110 and the second passage 120.

Figure 4B:
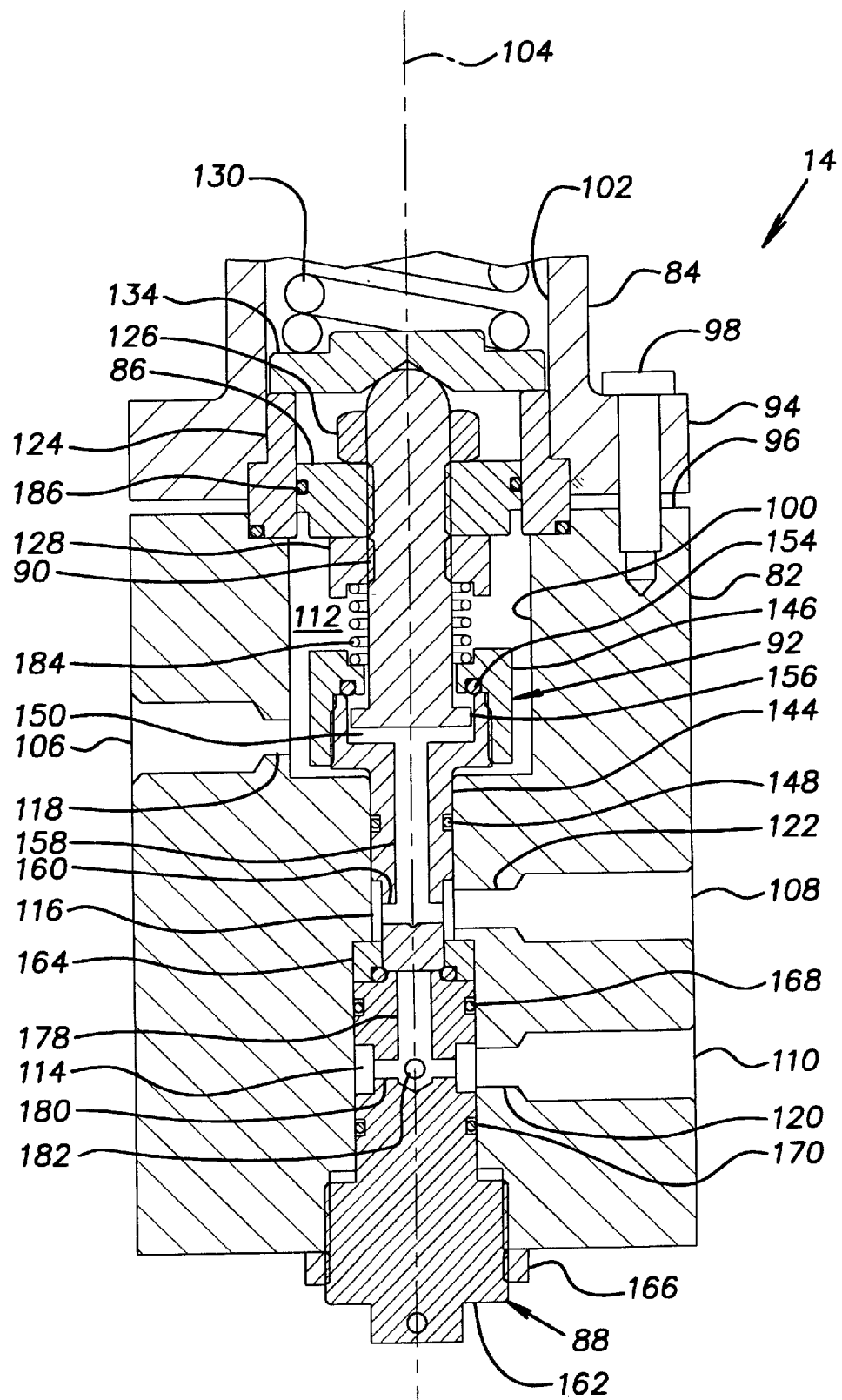
FIG. 4B is an enlarged fragmentary view of a portion of the pilot valve of FIG. 3B.

FIGS. 3B and 4B illustrate a second embodiment of the pilot valve 14 according to the present invention, wherein like reference numbers are used to indicate like structure. The second embodiment is substantially the same as the first embodiment described hereinabove, except that the diaphragm 129 is replaced with a seal member 186 encircling the periphery of the upper piston 86 which provides a seal between the upper piston 86 and the bore of the sleeve 124. Preferably, the seal member 186 is an o-ring. The seal member 186 is preferably used (with the diaphragm 129 omitted) for relatively high set pressures where it may be desirable to utilize the smaller effective area of the seal member 186. The diaphragm 129 is used (with the seal member 186 omitted) for relatively low set pressures where it may be desirable to utilize the larger effective area of the diaphragm 129.

During operation, the valve system 10 automatically maintains fluid in the pressure tank 52 at a desired system pressure. When the pressure tank 52 is at the desired system pressure, the valve-seat seal 80 of the main valve 12 is sealingly engaged with the valve seat 40 of the nozzle element 26 to prevent flow of fluid from the main valve inlet chamber 34 to the outlet chamber 36.

As best shown in FIG. 4A, the inlet chamber 112 of the pilot valve 14 is also at system pressure because of fluid communication through the pressure pickup and the inlet line 16. The system pressure in the inlet chamber 112 is exerted on the effective area of the upper piston 86 in a direction to move the upper piston upward 86 (as viewed in FIG. 4A). The downward force exerted by the upper compression spring 130, however, maintains the upper piston 86 and the upper spool 90 in a downward position wherein the inlet-valve disc 156 is separated from the inlet-valve seat 154 (FIG. 5A). With the upper spool 90 in the downward position, the lower compression spring 184, along with the pressure in the inlet chamber 112 acting on the effective area of the lower spool 92, maintains the lower spool 92 in a downward position wherein the vent-valve disc 174 sealingly closes the vent-valve seat 176 (FIG. 6A). Note that the upper spool 90 is sized such that it does not engage the lower spool 92 when they are both in their downward positions. The upper compression spring 130 is adjusted so that the system pressure overcomes the downward force to upwardly move the upper piston 86 and the upper spool 90 when the system pressure increases to a predetermined pressure greater than the desired system pressure or set pressure as discussed in more detail hereinafter.

It is noted that when the upper piston 86 and the upper spool 90 are in their downward most position as just described, the lower spring follower 134 engages the top abutment of the sleeve 124. The lower compression spring 184 along with the pressure in the inlet chamber 112 upwardly urge the upper spool 90 into engagement with the lower spring follower 134 and downwardly urge to lower spool 92 into engagement with the vent assembly 88. The lower compression spring 184 and the pressure in the inlet chamber 112 maintain the engagement between the lower spool 92 and the vent assembly 88 so that the vent valve 172 remains closed. The abutment of the sleeve 124 acts as a mechanical stop limiting downward movement of the upper compression spring 130 when the vent valve 172 is closed. Because the mechanical stop is rigidly connected to the main body 82 and is not rigidly connected to the lower spool 92 which carries the vent-valve disc 174, the vent-valve disc 174 and the lower spool 92 are free to flex or float against the pressure of the lower compression spring 184 and the pressure in the inlet chamber 112. This "flexible" or "floating" connection between the upper and lower spools 90, 92 prevents undesirable stress levels in the spools 90, 92 when utilized in relatively high pressure applications.

The control chamber 116 of the pilot valve 14 is also at system pressure because of fluid communication between the inlet chamber 112 and the control chamber 116 through the inlet valve 152, the valve chamber 150, and the first and second control passages 158, 160. No fluid communication is present between the control chamber 116 and the vent chamber 114, however, because the vent-valve disc 174 is closing the vent-valve seat 176.

As best shown in FIGS. 1 and 4A, the dome chamber 76 of the main valve 12 is also at system pressure because of fluid communication between the control chamber 116 of the pilot valve 14 and the dome chamber 76 through the control line 18. The pressure in the dome chamber 76 along with the compression spring 32 exert a downward force on the piston 30 to ensure that the valve-seat seal 80 remains sealingly engaged with the valve seat 40 of the nozzle element 26 to prevent flow of fluid through the main valve 12.

An increase in fluid pressure in the pressure tank 52 to a level slightly below the set pressure results in an increase in system pressure in the inlet chamber 112 such that the pressure in the inlet chamber 112 acting on the effective area of the upper piston 86 equals the force of the upper compression spring 130. Any further increase in fluid pressure in the pressure tank and inlet chamber 112 causes upward movement of the upper piston 86 and the upper spool 90 because the downward force of the upper compression spring 130 is overcome. Continued upward movement of the upper spool 90 seats the inlet-valve disc 156 on the inlet-valve seat 154 (FIG. 5B), wherein fluid communication between the between the inlet chamber 112 and the control chamber 116 is stopped. The closing of the inlet valve 152 isolates the inlet chamber 112 from the control chamber 116. The vent valve 172 remains closed because of the force of the lower compression spring 184 and the pressure acting on the effective area of the lower spool 92. Note that upward forces on the lower spool 92 are minimized by having the vent-valve disc 174, the bottom of the lower spool 92, exposed to the vent chamber 114 and by locating the control chamber 116 along the length of the lower spool 92 where it is exposed to a minimal effective area of the lower spool 92.

Further upward movement of the upper spool 90 lifts the lower spool 92 and unseats the vent-valve disc 174 from the vent-valve seat 176 (FIG. 6B), wherein fluid communication between the control chamber 116 and the vent chamber 114 is provided. As the vent-valve disc 174 is unseated, fluid in the control chamber 116 is released through the vent-valve seat 176, the first second and third vent passages 178, 180, 182, of the vent assembly 88, and the second passage 120 of the main body 82 to the vent port 110. From the vent port 110, the fluid is discharged from the pilot valve 14 through the discharge line 20. Fluid in the dome chamber 76 of the main valve 12 is also released because the control chamber 116 is in fluid communication with dome chamber 76 through the control line. The rate which the fluid is vented depends upon the distance the upper spool 90 lifts the lower spool 92.

Figure 2:
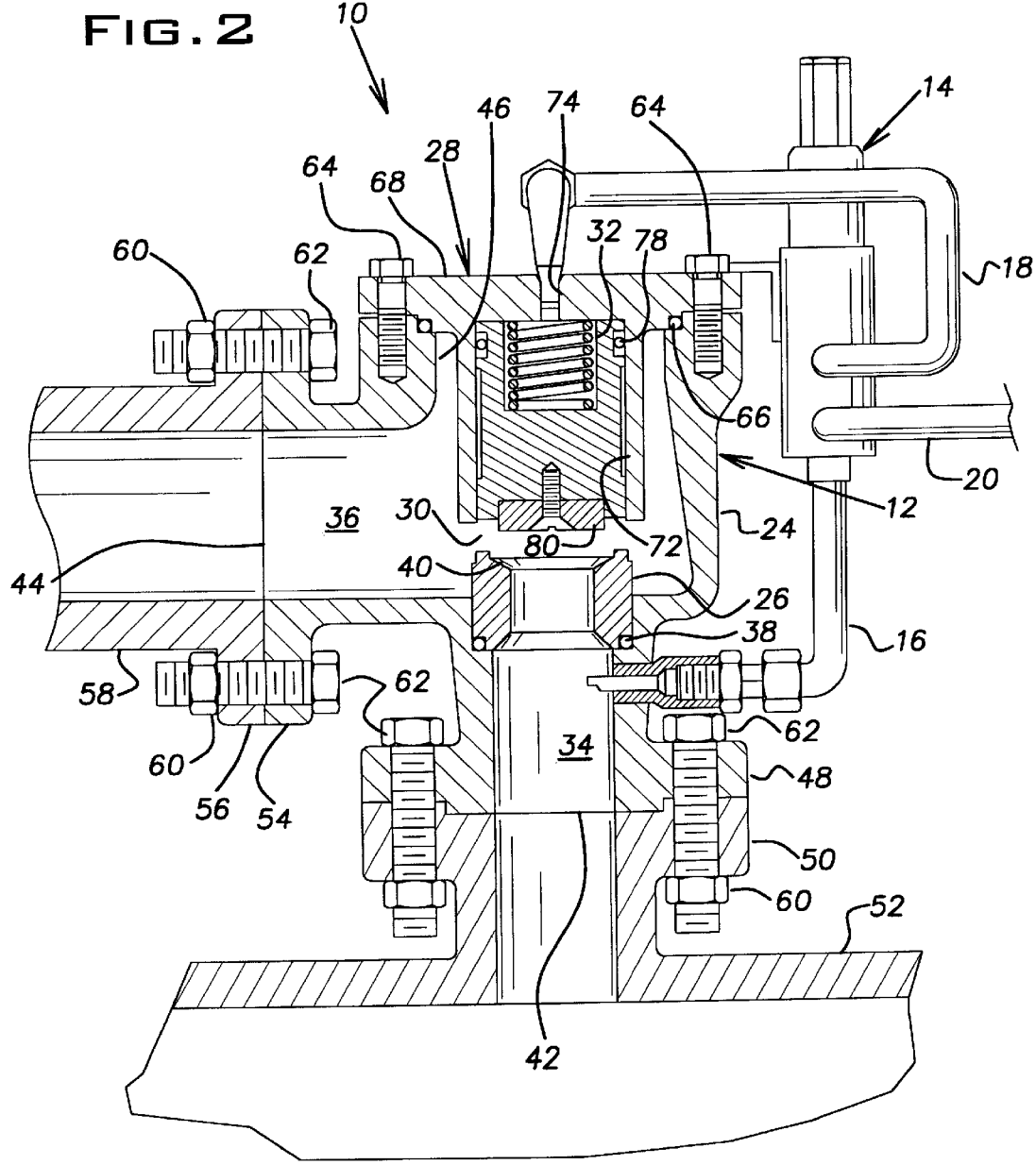
FIG. 2 is an elevational view, in partial cross-section, of the relief valve system of FIG. 1, wherein the relief valve is in a relieving position.

As best seen in FIG. 2, the release of fluid from the dome chamber 76 of the main valve 12 out of the vent port 110 of the pilot valve 14 results in a depressurization of the dome chamber 76. Due to this pressure reduction, the fluid pressure in the inlet chamber 34 of the main valve 12 raises the piston 30 to an open or unseated position and thereby allows fluid to flow from the main valve inlet chamber 34 to the outlet chamber 36. This passage of fluid through the main valve 12 from the pressure tank 52 to the discharge pipe 58 reduces the pressure in the pressure tank 52, that is, the system pressure.

Once the system pressure is reduced, the downward force of the upper compression spring 130 downwardly moves the upper piston 86 and the upper spool 90. The downward movement of the upper spool 90 reseats the vent-valve disc 174 on the vent-valve seat 176 (FIG. 6A), wherein there is no longer fluid communication between the control chamber 116 and the vent chamber 114. Note that the force of the lower compression spring 184 maintains the inlet valve 152 closed as the upper spool 90 is lowered prior to the closure of the vent valve 172. Once the vent valve 172 is closed, further downward movement of the upper spool 90 unseats the inlet-valve disc 156 from the inlet-valve seat 154 (FIG. 5A), wherein there is again fluid communication between the inlet chamber 112 and the control chamber 116.

The return of fluid communication between the inlet chamber 112 and the control chamber 116, and thus the dome chamber 76 of the main valve 12, allows the dome chamber 76 to slowly return to system pressure. As best shown in FIG. 1, the pressurization of the dome chamber 76 along with the bias of the compression spring 32 returns the piston 30 to a closed or seated position to prevent further fluid flow from the inlet chamber 34 to the outlet chamber 36.

The valve system 10 of the present invention provides a relatively small system hysteresis, that is, failure to exactly return the system pressure to the desired system pressure or overcorrection of the system pressure. This relatively small overcorrection, compared to prior art systems, reduces the amount of fluid discharged or lost to maintain the desired system pressure in the pressure tank 52. This is made possible by slow controlled pressurization and depressurization. Flow capacity through the main valve 12 from the pressure tank 52 to the discharge line 58 linearly increases and decreases in proportion to the overpressure of the pressure tank 52.

From the foregoing, it can be seen that the modulating action of the pressure relief valve system 10 is proportionally responsive to the overpressure of the pressure tank 52 so that the valve system 10 vents only an amount of system fluid which is necessary to eliminate the overpressure, thereby reducing excessive loss of system fluid.

Although particular embodiments of the invention have been described in detail, it will be understood that the invention is not limited correspondingly in scope, but includes all changes and modifications coming within the spirit and terms of the claims appended hereto.

What is claimed is:

1. A pilot valve comprising:
   a body having a channel formed therein, a unitary inlet chamber formed along said channel, an inlet port in communication with said inlet chamber, a control port in communication with said channel, and a vent port in communication with said channel;
   a first spool movable within said channel in response to variations in a fluid pressure value within said unitary inlet chamber;
   a second spool movable within said channel, said second spool cooperating with said first spool to form an inlet valve regulating fluid flow between said inlet chamber and said control port and said second spool cooperating with said body to form a vent valve regulating flow between said control port and said vent port; and
   a spring between said first spool and said second spool and urging said first and second spools in opposite directions.

2. The pilot valve according to claim 1, wherein said spring urges said second spool in a direction to close said vent valve when said inlet valve is open.

3. The pilot valve according to claim 1, wherein said inlet valve includes an inlet-valve seat carried by said second spool and a inlet-valve disc carried by said first spool, said vent valve includes a vent-valve disc carried by said second spool and a vent-valve seat secured to said body, and said spring urges said vent-valve disc toward said vent-valve seat to close said vent valve when said inlet valve is open.

4. The pilot valve according to claim 1, wherein said spring is a compression spring.

5. The pilot valve according to claim 1, wherein said body has a vent chamber formed along said channel in communication with said vent port, said body has a control chamber formed along said channel in communication with said control port, and said control chamber is located between and spaced apart from said inlet and vent chambers.

6. The pilot valve according to claim 1, wherein said first and second spools are movable relative to one another and interlocked to limit movement relative to one another.

7. The pilot valve according to claim 1, wherein said first spool resiliently bears on said second spool via said spring to close said vent-valve when said inlet valve is open.

8. The pilot valve according to claim 1, further comprising another spring urging said first spool in a direction opposite to that exerted by force due to pressure in said inlet chamber.

9. The pilot valve according to claim 8, further comprising a follower between said another spring and said first spool and an abutment limiting movement of said another spring and said follower toward said first spool when said vent valve is closed, and wherein said abutment is rigidly connected to said body.

10. A pilot valve comprising:
    a body having a channel formed therein, a unitary inlet chamber formed along said channel, an inlet port in communication with said inlet chamber, a control port in communication with said channel, and a vent port in communication with said channel;
    a first spool movable within said channel in response to variations in a fluid pressure value within said inlet chamber;
    a second spool movable within said channel, said second spool cooperating with said first spool to form an inlet valve regulating fluid flow between said inlet chamber and said control port and said second spool cooperating with said body to form a vent valve regulating flow between said control port and said vent port; and
    a spring between said first spool and said second spool, wherein said first spool resiliently bears on said second spool via said spring to close said vent-valve when said inlet valve is open.

11. The pilot valve according to claim 10, wherein said spring urges second spool in a direction to close said vent valve when said inlet valve is open.

12. The pilot valve according to claim 10, wherein said inlet valve includes an inlet-valve seat carried by said second spool and a inlet-valve disc carried by said first spool, said vent valve includes a vent-valve disc carried by said second spool and a vent-valve seat secured to said body, and said spring urges said vent-valve disc toward said vent-valve seat to close said vent valve when said inlet valve is open.

13. The pilot valve according to claim 10, wherein said spring is a compression spring.

14. The pilot valve according to claim 10, wherein said body has a vent chamber formed along said channel in communication with said vent port, said body has a control chamber formed along said channel in communication with said control port, and said control chamber is located between and spaced apart from said inlet and vent chambers.

15. The pilot valve according to claim 10, wherein said first and second spools are movable relative to one another and interlocked to limit relative movement relative to one another.

16. The pilot valve according to claim 10, further comprising another spring urging said first spool in a direction opposite to that exerted by force due to pressure in said inlet chamber.

17. The pilot valve according to claim 16, further comprising a follower between said another spring and said first spool and an abutment limiting movement of said another spring and said follower toward said first spool when said vent valve is closed, and wherein said abutment is rigidly connected to said body.

18. A pilot valve comprising:
    a body having a channel formed therein, a unitary inlet chamber formed along said channel, an inlet port in communication with said inlet chamber, a control port in communication with said channel, and a vent port in communication with said channel;
    a piston movable within said channel in response to variations is a fluid pressure value within said inlet chamber;
    a first spool movable within said channel and rigidly secured to said piston for movement therewith, said first spool carrying an inlet-valve disc;
    a second spool movable within said channel and carrying a vent-valve disc, said second spool carrying an inlet-valve seat cooperating with said inlet valve disc carried by said first spool to regulate fluid flow between said inlet chamber and said control port;
    a vent-valve seat secured to said body and cooperating with said vent-disc carried by said second spool to regulate flow between said control port and said vent port;
    a first spring urging said first spool in a direction opposite to that exerted by force due to pressure in said inlet chamber; and
    a second spring between said piston and said second spool, wherein said piston resiliently bears on said second spool via said second spring to close said vent-valve when said inlet valve is open.

19. The pilot valve according to claim 18, further comprising a follower between said second spring and said first spool and an abutment limiting movement of said second spring and said follower toward said first spool when said vent valve is closed, and wherein said abutment is rigidly connected to said body.

20. The pilot valve according to claim 18, wherein said body has a vent chamber formed along said channel in communication with said vent port, said body has a control chamber formed along said channel in communication with said control port, and said control chamber is located between and spaced apart from said inlet and vent chambers.

21. A pilot valve comprising:
   a body having a channel formed therein, an inlet chamber formed along said channel, an inlet port in communication with said inlet chamber, a control port in communication with said channel, and a vent port in communication with said channel;
   a first spool movable within said channel in response to fluid pressure within said inlet chamber;
   a second spool movable within said channel, said second spool cooperating with said first spool to form an inlet valve regulating fluid flow between said inlet chamber and said control port and said second spool cooperating with said body to form a vent valve regulating flow between said control port and said vent port;
   a spring between said first spool and said second spool and urging said first and second spools in opposite directions;
   another spring urging said first spool in a direction opposite to that exerted by force due to pressure in said inlet chamber;
   a follower between said another spring and said first spool; and
   an abutment limiting movement of said another spring and said follower toward said first spool when said vent valve is closed, said abutment being rigidly connected to said body.

22. A pilot valve comprising:
   a body having a channel formed therein, an inlet chamber formed along said channel, an inlet port in communication with said inlet chamber, a control port in communication with said channel, and a vent port in communication with said channel;
   a first spool movable within said channel in response to fluid pressure within said inlet chamber;
   a second spool movable within said channel, said second spool cooperating with said first spool to form an inlet valve regulating fluid flow between said inlet chamber and said control port and said second spool cooperating with said body to form a vent valve regulating flow between said control port and said valve port;
   a spring between said first spool and said second spool, wherein said first spool resiliently bears on said second spool via said spring to close said vent valve when said inlet valve is open;
   another spring urging said first spool in a direction opposite to that exerted by force due to pressure in said inlet chamber;
   a follower between said another spring and said first spool; and
   an abutment limiting movement of said another spring and said follower toward said first spool when said vent valve is closed, said abutment being rigidly connected to said body.

23. A pilot valve comprising:
   a body having a channel formed therein, an inlet chamber formed along said channel, an inlet port in communication with said inlet chamber, a control port in communication with said channel, and a vent port in communication with said channel;
   a piston movable within said channel in response to fluid pressure within said inlet chamber;
   a first spool movable within said channel and rigidly secured to said piston for movement therewith, said first spool carrying an inlet-valve disc;
   a second spool movable within said channel and carrying a vent-valve disc, said second spool carrying an inlet-valve seat cooperating with said inlet valve disc carried by said first spool to regulate fluid flow between said inlet chamber and said control port;
   a vent-valve seat secured to said body and cooperating with said vent-disc carried by said second spool to regulate flow between said control port and said vent port;
   a first spring urging said first spool in a direction opposite to that exerted by force due to pressure in said inlet-chamber;
   a second spring between said piston and said second spool, wherein said piston resiliently bears on said second spool via said second spring to close said vent-valve when said inlet-valve is open;
   a follower between said second spring and said first spool; and
   an abutment limiting movement of said second spring and said follower toward said first spool when said vent valve is closed, said abutment being rigidly connected to said body.

* * * * *